United States Patent
Chen et al.

(10) Patent No.: US 9,952,477 B2
(45) Date of Patent: Apr. 24, 2018

(54) LIQUID CRYSTAL DISPLAY PANEL

(71) Applicant: SHENZHEN CHINA STAR OPTOELECTRONICS TECHNOLOGY CO., LTD., Shenzhen (CN)

(72) Inventors: Caiqin Chen, Shenzhen (CN); Je Hao Hsu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,643

(22) PCT Filed: Dec. 16, 2014

(86) PCT No.: PCT/CN2014/093900
§ 371 (c)(1),
(2) Date: Apr. 20, 2016

(87) PCT Pub. No.: WO2016/074308
PCT Pub. Date: May 19, 2016

(65) Prior Publication Data
US 2016/0363830 A1     Dec. 15, 2016

(30) Foreign Application Priority Data

Nov. 14, 2014    (CN) .......................... 2014 1 0650152

(51) Int. Cl.
*G02F 1/1362*     (2006.01)
*G09G 3/36*     (2006.01)

(52) U.S. Cl.
CPC .. *G02F 1/136286* (2013.01); *G02F 1/136213* (2013.01); *G09G 3/3614* (2013.01);
(Continued)

(58) Field of Classification Search
CPC ... G09G 2300/0804; G09G 2320/0219; G09G 2300/0842; G09G 3/3648; G09G 3/3614; G02F 1/136213; G02F 1/136286
See application file for complete search history.

(56) References Cited

U.S. PATENT DOCUMENTS 5,923,310 A * 7/1999 Kim ..................... G09G 3/3648
345/90
2009/0102992 A1* 4/2009 Chung ................. G09G 3/3648
349/37

(Continued)

FOREIGN PATENT DOCUMENTS

| CN | 101520998 A | 9/2009 |
| CN | 102269905 A | 12/2011 |
| TW | 201040925 A | 11/2010 |

OTHER PUBLICATIONS

International Search Report (Forms PCT/ISA/210 and PCT/ISA/220) and the Written Opinion (Form PCT/ISA/237) dated Aug. 21, 2015, by the State Intellectual Property Office of China acting as the International Searching Authority in corresponding International Application No. PCT/CN2014/093900. (11 pages).

*Primary Examiner* — Abhishek Sarma
(74) *Attorney, Agent, or Firm* — Buchanan Ingersoll & Rooney PC (57) ABSTRACT

A liquid crystal display panel is disclosed. Said liquid crystal display panel comprises a plurality of sub pixels that are configured in a pixel array, said pixel array being formed by a plurality of data lines and a plurality of scanning lines that are configured orthogonally to each other, and said plurality of scanning lines comprising: a first scanning line, which is turned on during a first time period after a polarity of a voltage of a driving signal of a data line is reversed, wherein the first sub pixel is charged through said data line; and at least one second scanning line, which are turned on during (Continued)

a second time period, wherein the second sub pixel is charged through said data line. A value of an equivalent capacitor of the first sub pixel is larger than that of the second sub pixel, so that the sustaining voltage of the first sub pixel is equal to that of the second sub pixel.

9 Claims, 10 Drawing Sheets

(52) U.S. Cl.
CPC ... *G09G 3/3648* (2013.01); *G09G 2300/0804* (2013.01); *G09G 2300/0842* (2013.01); *G09G 2320/0219* (2013.01)

(56) References Cited

U.S. PATENT DOCUMENTS

| | | |
|---|---|---|
| 2010/0289792 A1 | 11/2010 | Liao et al. |
| 2011/0102414 A1 | 5/2011 | Lin et al. |
| 2011/0221729 A1 | 9/2011 | Chuang et al. |
| 2012/0098816 A1* | 4/2012 | Lee ..................... G09G 3/3648 345/212 |

* cited by examiner

LIQUID CRYSTAL DISPLAY PANEL

CROSS REFERENCE TO RELATED APPLICATION

The present application claims benefit of Chinese patent application CN 201410650152.6, entitled "Liquid Crystal Display Panel" and filed on Nov. 14, 2014, which is incorporated herein by reference.

FIELD OF THE INVENTION

The present disclosure relates to the technical field of display, and particularly to a liquid crystal display panel.

BACKGROUND OF THE INVENTION

With the development of liquid crystal display technology, most of the liquid crystal displays of various kinds available nowadays have the advantages of low cost, low power consumption, and high performance. The various kinds of components of the liquid crystal display panel can be integrated through precise design, so that a best display effect can be ensured while the cost and power consumption thereof can be reduced.

In the field of Thin Film Transistor Liquid Crystal Display (TFT-LCD), the liquid crystal display panel needs to be provided with a large amount of source driving circuits and gate driving circuits to perform pixel driving in vertical direction and horizontal direction respectively. Compared with source driving chips, the cost and power consumption of gate driving chips are relatively low. Therefore, the number of data lines can be reduced through a reasonable design of the structure of the pixel array, so that the number of source driving chips used therein can be reduced, and the manufacturing cost and power consumption of the liquid crystal display can be both reduced accordingly.

For example, in the prior art, the sub pixels adjacent to each other along a horizontal direction of Half Source Driving (HSD) pixel array share the same data line, so that the number of data lines is half of the number of data lines of traditional liquid crystal driving pixel array. The adjacent sub pixels in the same row are connected with different scanning lines, while sub pixels spaced from each other by one sub pixel in the same row are connected with the same scanning line. Therefore, the number of scanning lines is twice as the number of scanning lines of traditional liquid crystal driving pixel array.

In general, in a HSD pixel array, a two-horizontal line reversion driving mode, i.e., a two-row reversion driving mode can be used. The polarity of the voltage of the data driving signal is reversed once during two scanning cycles. Since the number of scanning lines is doubled, the scanning time allocated to each scanning line reduces, and thus the charge time of the sub pixel reduces accordingly. In addition, due to the impedance of data lines, a delay distortion of waveform of the voltage signal would be generated during the transmission of the voltage signal. Such distortion would become more serious near the ends of data lines. Consequently, a difference between a charge rate of sub pixels in odd-numbered columns and that of sub pixels in even-numbered columns at the ends of data lines would be generated. For example, sub pixels in odd-numbered columns driven at first are undercharged, and their brightness is relatively low. In contrast, sub pixels in even-numbered columns driven later are charged better, and their brightness is relatively high.

In this case, the sub pixels of the liquid crystal display panel would present different degrees of brightness in space during the same frame cycle, and bright-dark lines would occur in the LCD with a HSD pixel array.

SUMMARY OF THE INVENTION

The technical problem to be solved by the present disclosure is to eliminate the defects of uneven brightness in space presented by a liquid crystal display panel.

In order to solve the aforesaid technical problem, an embodiment of the present disclosure provides a liquid crystal display panel, comprising:

a plurality of sub pixels that are configured in a pixel array, said pixel array being formed by a plurality of data lines and a plurality of scanning lines that are configured orthogonally to each other, and said plurality of scanning lines comprising:

a first scanning line, which is connected with a first sub pixel, and turned on during a first time period after a polarity of a voltage of a driving signal of a data line is reversed, the first sub pixel being charged through said data line; and at least one second scanning line, which are connected with at least one second sub pixel respectively, and turned on during a second time period after said first time period, the second sub pixel being charged through said data line, wherein a value of an equivalent capacitor of the first sub pixel is larger than that of the second sub pixel, so that a sustaining voltage of the first sub pixel is equal to that of the second sub pixel.

Preferably, a value of a storage capacitor of said first sub pixel is larger than that of said second sub pixel, and/or a value of a liquid crystal capacitor of said first sub pixel is larger than that of said second sub pixel.

Preferably, a voltage of a driving signal of said second scanning line is equal to that of said first scanning line, so that a feedthrough voltage of said first sub pixel is less than that of the second sub pixel.

Preferably, said data line is used for driving said first sub pixel and said at least one second sub pixel, and the polarity of the voltage of the driving signal of said data line is reversed periodically.

Preferably, one single second scanning line is provided, and a reversing cycle of the polarity of the voltage of the driving signal of said data line is equal to two scanning cycles.

Preferably, two second scanning lines are provided, and a reversing cycle of the polarity of the voltage of the driving signal of said data line is equal to three scanning cycles.

Preferably, the first time period after the polarity of the voltage of the driving signal of said data line is reversed is equal to the second time period in duration, and a turn-on time of said first scanning line is equal to a turn-on time of said at least one second scanning line in duration.

Preferably, the polarity of the voltage of the driving signal of said data line in the first time period is the same as that in the second time period.

Preferably, the polarity of the voltage of the driving signal of said data line is reversed through row reversion mode.

Preferably, said pixel array is a half source driving pixel array or a tri-gate pixel array.

According to the embodiments of the present disclosure, the sub pixels are configured with different equivalent capacitances, so that the difference among charge rates of sub pixels charged by the data lines can be compensated. In this case, the sub pixels, after being charged by the data lines, can obtain a stable pixel voltage with a same value through the effect of the feedthrough voltage. The sub pixels can present a uniform degree of brightness in space, and thus the bright-dark lines in the liquid crystal display panel can be eliminated.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the technical solution of the present disclosure or the prior art, and constitute one part of the description, but not limit the technical solution of the present disclosure.

DETAILED DESCRIPTION OF THE EMBODIMENTS

The present disclosure will be illustrated in more detail hereinafter with reference to the drawings to further clarify the objectives, technical solutions and advantages of the present disclosure. As long as there is no structural conflict, all the technical features mentioned in all the embodiments may be combined together in any manner, and the technical solutions obtained in this manner all fall within the scope of the present disclosure.

Embodiment 1

Figure 1:
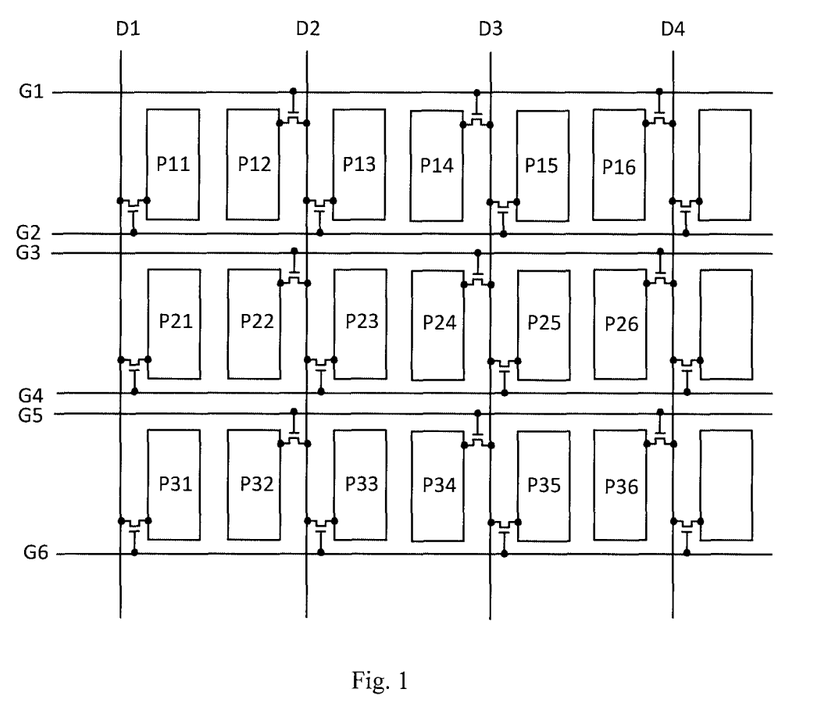
FIG. 1 is a structural diagram of a HSD liquid crystal display panel according to Embodiment 1 of the present disclosure.

FIG. 1 is a structural diagram of a HSD liquid crystal display panel according to the present embodiment. As shown in FIG. 1, the display panel comprises a pixel array formed by a plurality of data lines (such as data lines D1, D2, D3, and D4 as shown in FIG. 1) and a plurality of scanning lines (such as scanning lines G1, G2, G3, and G4 as shown in FIG. 1) that are configured orthogonally to each other, and a plurality of sub pixels P11 to P36 that are configured in the array. For the sake of conciseness, it is defined here that a sub pixel Pxy is arranged in row x, and column y. For example, the sub pixel P12 is arranged in row 1, and column 2, and other sub pixels are arranged in the same manner.

The sub pixel P12 is connected with the scanning line G1 and the data line D2, and a sub pixel P13 is connected with the scanning line G2 and the data line D2. P12 and P13 are arranged at the two sides of the data line D2 respectively. Similarly, a sub pixel P22 is connected with the scanning line G3 and the data line D2, and a sub pixel P23 is connected with the scanning line G4 and the data line D2. Sub pixels P22 and P23 are arranged at the two sides of the data line D2 respectively. Other sub pixels are arranged in a similar manner.

In the prior art, the sub pixels of a HSD liquid crystal display panel would present different degrees of brightness in space during the same frame cycle, and thus bright-dark lines along the vertical direction would occur in the LCD with a HSD pixel array. There are mainly two reasons for this phenomenon.

Figure 2:
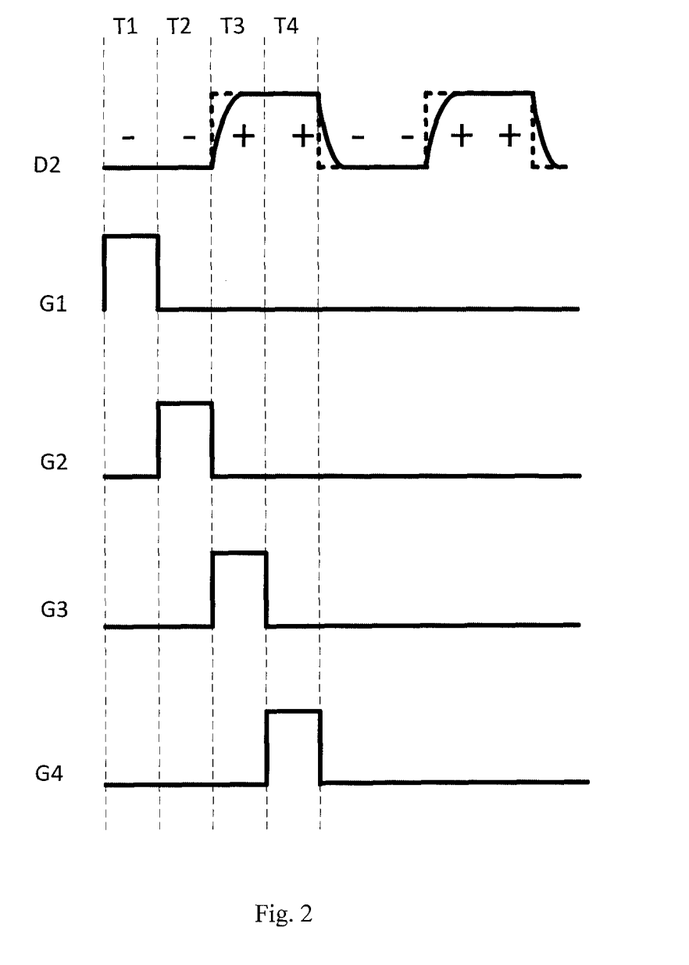
FIG. 2 schematically shows waveforms of voltages of driving signals of a data line and several scanning lines of a HSD panel in the prior art.

First, the RC delay of the data line would lead to differences among charge rates of the sub pixels. The waveforms of voltages of driving signals of a data line and several scanning lines during one frame cycle are shown in FIG. 2. According to the present embodiment, the polarity of the voltage of the driving signal provided by the data line D2 is reversed periodically. A first time period after polarity reversion is a scanning cycle T3, and a second time period is a scanning cycle T4. The data line D2 is used for driving the first sub pixel P22 and the second sub pixel P23. During the scanning cycle T3, the first scanning line G3 is turned on, and the data line D2 charges the first sub pixel P22 with a data signal voltage of a positive polarity. Similarly, during the scanning cycle T4, the second scanning line G4 is turned on, and the data line D2 charges the second sub pixel P23 with a data signal voltage of a positive polarity. As shown by the dotted line in FIG. 2, due to the RC delay of the data line D2, during a certain time period from the beginning of the scanning cycle T3, the driving signal of the data line D2 cannot reach a preset charge level, which renders that the first sub pixel P22 is undercharged, and the brightness thereof is relatively low. By contrast, during the scanning cycle T4, the driving signal of the data line D2 has stably reached the preset charge level, so that the second sub pixel P23 can be charged completely, and the brightness thereof is relatively high.

Second, the reversion driving mode would lead to differences among charge rates of the sub pixels. In general, in a HSD pixel array, a two-horizontal line reversion driving mode, i.e., a two-row reversion driving mode can be used. During two scanning cycles, the polarity of the voltage of the data driving signal is reversed once. That is to say, a reversing cycle of the polarity of the voltage of the driving signal of the data line is equal to two scanning cycles. As shown in FIG. 2, at an initial moment of the scanning cycle T3, the polarity of the voltage of the driving signal of the data line D2 is reversed, i.e., the driving signal jumps from a low-level signal in the scanning cycle T2 to a high-level signal in the scanning cycle T3. At this time, since the voltage of the driving signal of the data line D2 should be changed to a rather large extent, the driving signal of the data line D2 cannot reach the preset charge level during a certain time period from the beginning of the scanning cycle T3, which renders that the sub pixel P22 is undercharged. By contrast, at an initial moment of the scanning cycle T4, the polarity of the voltage of the driving signal of the data line D2 is not reversed. During the scanning cycle T4, the driving signal of the data line D2 can be maintained at the stable preset charge level, and thus the sub pixel P23 can be charged completely.

On the other hand, since there are parasite capacitors among the sub pixels, a feedthrough voltage would be generated in a pixel electrode of a sub pixel at the moment when the scanning line is turned off, and thus the voltage of the pixel electrode would be reduced. The feedthrough voltage ΔVp can be expressed as:

$$\Delta Vp=(Vgh-Vgl)\times Cgs/(Cst+Clc+Cgs),$$

wherein Vgh is a high-level signal of a driving voltage of the scanning line, i.e., a turn-on voltage; Vgl is a low-level signal of the driving voltage of the scanning line, i.e., a turn-off voltage; Cgs is the parasite capacitor; Cst is a storage capacitor; and Clc is a liquid crystal capacitor.

Figure 3:
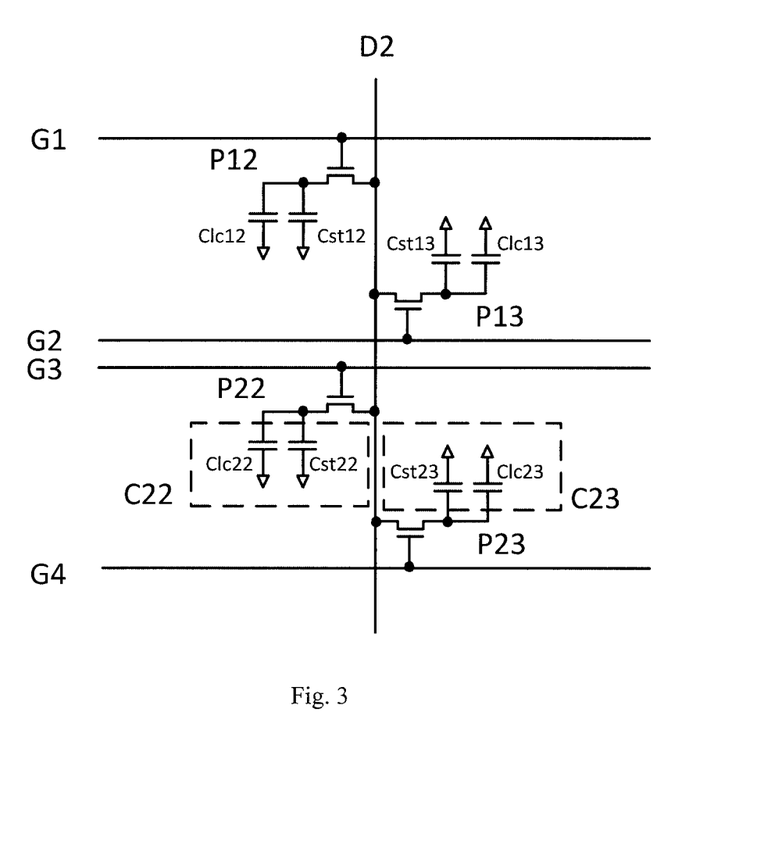
FIG. 3 schematically shows an equivalent circuit diagram of a sub pixel according to Embodiment 1.

As shown in the equivalent circuit diagram shown of FIG. 3, an equivalent capacitor is formed by the storage capacitor Cst and the liquid crystal capacitor Clc in parallel connection with each other. In the prior art, an equivalent capacitor C22 of the sub pixel P22 is equal to an equivalent capacitor C23 of the sub pixel P23, so that a feedthrough voltage ΔVp22 of the sub pixel P22 is equal to a feedthrough voltage ΔVp23 of the sub pixel P23.

Figure 4:
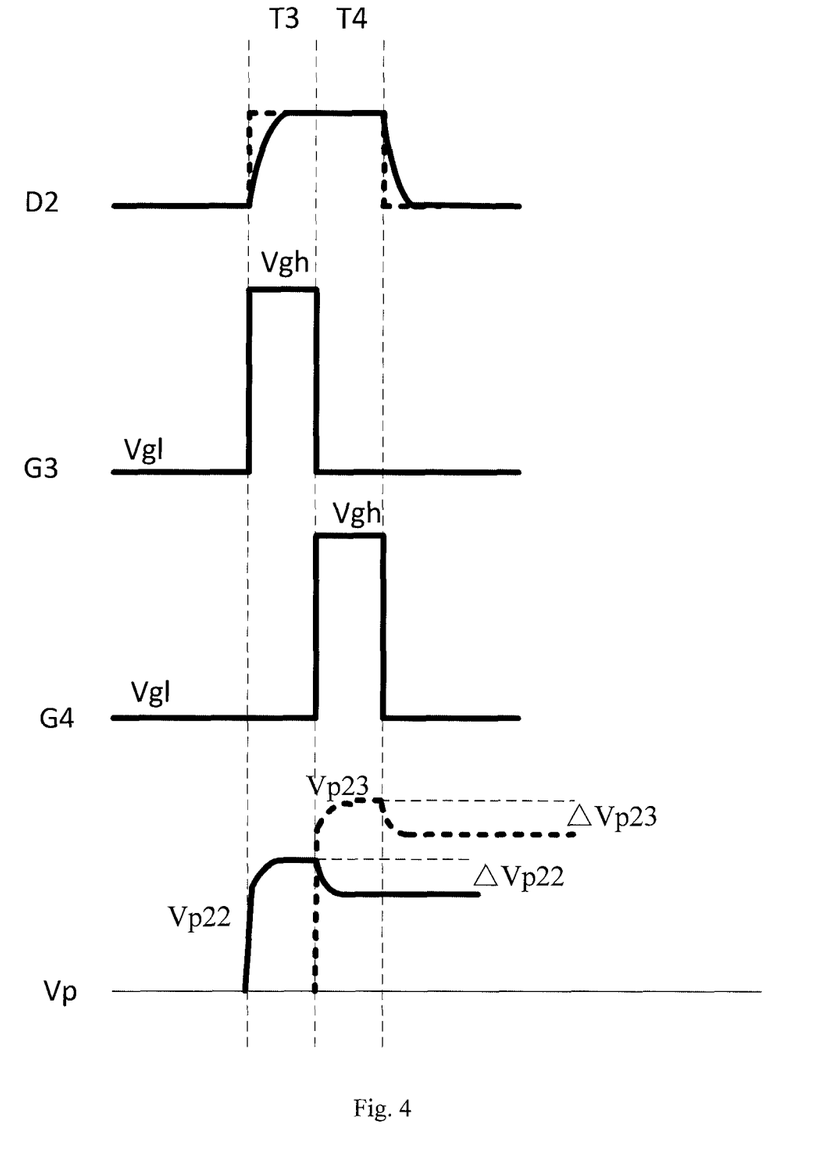
FIG. 4 schematically shows waveforms of voltages of pixel electrodes of sub pixels of a HSD panel in the prior art; 20

Specifically, the waveforms of voltages of pixel electrodes of sub pixels P22 and P23 vary as shown in FIG. 4.

At the initial moment of the scanning cycle T3, the scanning line G3 is turned on, and the driving signal of the data line D2 cannot reach the preset charge level, which would render that the charge rate of the sub pixel P22 charged by the data line D2 is relatively low. At a moment when the scanning cycle T3 comes to an end, a pixel voltage Vp22 of the sub pixel P22 reaches its highest value. After the scanning line G3 is turned off, a feedthrough voltage ΔVp22 gradually reduces the pixel voltage Vp22 to a stable sustaining voltage.

At the initial moment of the scanning cycle T4, the scanning line G4 is turned on, and the driving signal of the data line D2 can be maintained at the stable preset charge level, so that the charge rate of the sub pixel P23 charged by the data line D2 is relatively high. At a moment when the scanning cycle T4 comes to an end, a pixel voltage Vp23 of the sub pixel P23 reaches its highest value, which is higher than the highest value of the pixel voltage Vp22 of the sub pixel P22. After the scanning line G4 is turned off, a feedthrough voltage ΔVp23 gradually reduces the pixel voltage Vp23 to a stable sustaining voltage. Since the voltage of the driving signal of the scanning line G3 is completely the same as that of the scanning line G4, and the equivalent capacitor C22 of the sub pixel P22 is equal to the equivalent capacitor C23 of the sub pixel P23, i.e., the feedthrough voltage ΔVp23 is equal to the feedthrough voltage ΔVp22, the stable sustaining voltage Vp22 of the sub pixel P22 obtained in the same frame period is lower than the stable sustaining voltage Vp23 of the sub pixel P23, which would result in the brightness presented by the sub pixel P22 being lower than that of the sub pixel P23.

Based on the above analysis, in the present embodiment, the sub pixels are configured with different values of equivalent capacitor, so that different feedthrough voltages can be generated. In this case, the sub pixels, after being charged by the data lines, can obtain the sustaining voltage with the same value. The sub pixels can present a uniform degree of brightness in space, and thus the bright-dark lines along the vertical direction of the HSD liquid crystal display panel can be eliminated.

As shown in FIG. 3 again, the equivalent capacitor C22 of the sub pixel P22 can be configured to be larger than the equivalent capacitor C23 of the sub pixel P23, so that the feedthrough voltage ΔVp22 of the sub pixel P22 can be less than the feedthrough voltage ΔVp23 of the sub pixel P23. Specifically, it is possible to configure a storage capacitor Cst22 larger than a storage capacitor Cst23, or a liquid crystal capacitor Clc22 larger than a liquid crystal capacitor Clc23. Since the equivalent capacitor is formed by the storage capacitor Cst and the liquid crystal capacitor Clc in parallel connection with each other, it can be readily understood that, it is possible to configure the storage capacitor Cst22 larger than the storage capacitor Cst23, and the liquid crystal capacitor Clc22 larger than the liquid crystal capacitor Clc23 at the same time.

Figure 5:
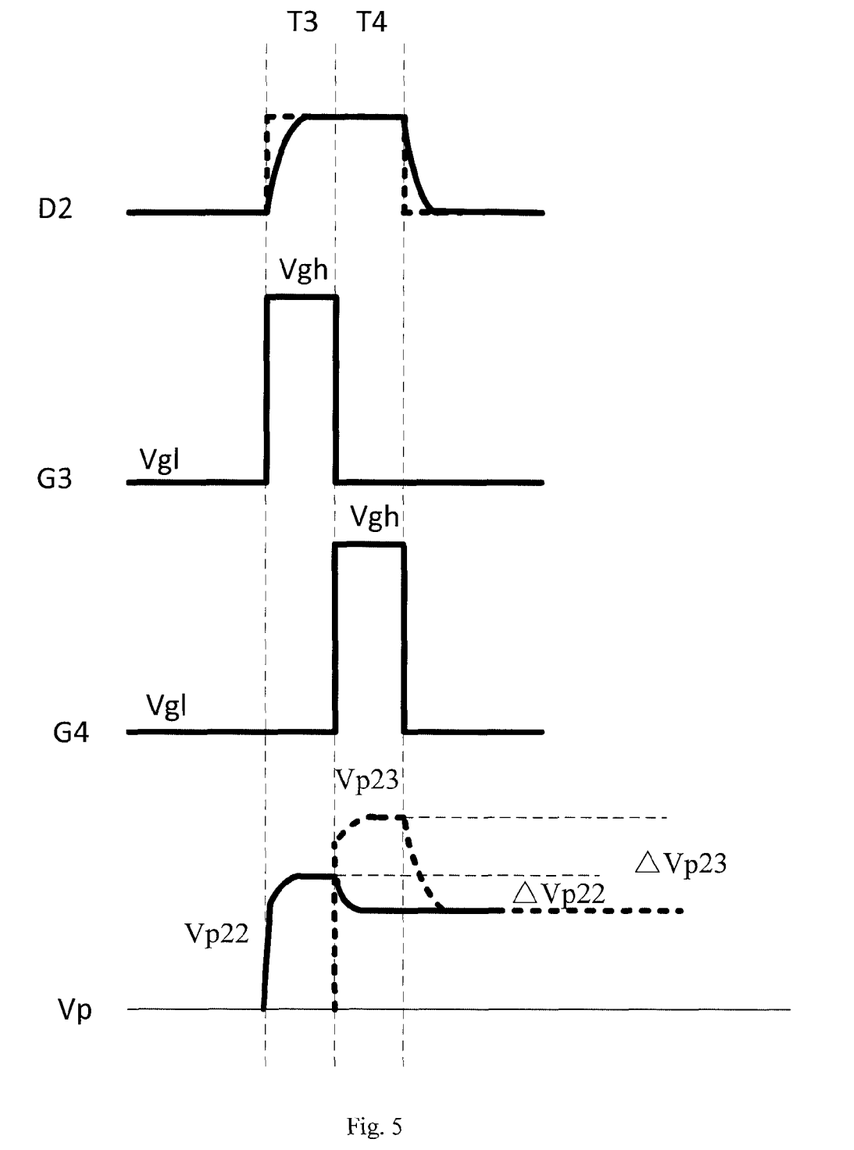
FIG. 5 schematically shows waveforms of voltages of pixel electrodes of sub pixels of a HSD panel after being compensated by equivalent capacitances according to Embodiment 1.

In this case, the waveforms of voltages of pixel electrodes of sub pixels P22 and P23 vary as shown in FIG. 5.

At an initial moment of a scanning cycle T3, the first scanning line G3 is turned on, and a driving signal of the data line D2 cannot reach a preset charge level. In this case, the charge rate of the sub pixel P22 charged by the data line D2 is relatively low. At an end of the scanning cycle T3, a pixel voltage Vp22 of the sub pixel P22 reaches its highest value. After the scanning line G3 is turned off, a feedthrough voltage ΔVp22 gradually reduces the pixel voltage Vp22 to a stable sustaining voltage.

As shown in FIG. 5, a polarity of the driving signal of the data line D2 in the scanning cycle T3 is the same as that in a scanning cycle T4. At an initial moment of the scanning cycle T4, the second scanning line G4 is turned on, and the driving signal of the data line D2 can be maintained at the stable preset charge level. At an end of the scanning cycle T4, a pixel voltage Vp23 of the sub pixel P23 reaches its highest value, which is higher than the highest value of Vp22 of the sub pixel P22. After the scanning line G4 is turned off, a feedthrough voltage ΔVp23 gradually reduces the pixel voltage Vp23 to a stable sustaining voltage.

Since the voltage of the driving signal provided by the scanning line G3 is the same as that provided by the scanning line G4, and at the moment when the scanning line G4 is turned off, the voltage of the driving signal thereof can reach the preset level, which is completely the same as that when the scanning line G3 is turned off, a difference between a turn-on voltage and a turn-off voltage, i.e., (Vgh-Vgl) of the sub pixel P22 is the same as that of the sub pixel P23. As shown in FIG. 5, according to the present embodiment, the equivalent capacitor C22 can be configured to be larger than the equivalent capacitor C23, so that the feedthrough voltage ΔVp22 can be less than the feedthrough voltage ΔVp23. In this case, the sustaining voltage of the sub pixel P22 is the same as that of the sub pixel P23, and thus the brightness presented by the sub pixel P22 is the same as that of the sub pixel P23.

It should be noted that, the first time period T3 is equal to the second time period T4 in duration. That is, the time period during which the scanning line G3 is turned on is equal to the time period during which the scanning line G4 is turned on. Moreover, the voltage of the driving signal provided by the scanning line G3 is the same as that provided by the scanning line G4. Therefore, according to the present embodiment, the driving modes of the gate driving chip and the source driving chip as used in the prior art need not to be changed. Hence, the liquid crystal display panel of the present embodiment is compatible with the driving chips in the prior art.

In addition, as mentioned in the above context, at the initial moment of the scanning cycle T3, the driving signal of the data line D2 cannot reach the preset charge level. In this case, the charge rate of the sub pixel P22 charged by the data line D2 is relatively low. In fact, compared with the sub pixel P23, the equivalent capacitor of the sub pixel P22 is relatively larger. That is, during the scanning cycle T3, the charge load of the sub pixel P22 charged by the data line D2 is relatively high, and thus the charge rate thereof is further reduced. For the aforesaid two reasons, the difference between the peak value of the pixel voltage Vp22 reached therein when the scanning line G3 is turned off and the peak value of the pixel voltage Vp23 when the scanning line G4 is turned off would become larger.

According to the present embodiment, the equivalent capacitor C22 can be configured to be larger than the equivalent capacitor C23, and the difference between the equivalent capacitors C22 and C23 can be set to a reasonable value, so that the difference between the peak value of Vp22 and the peak value of Vp23 can be compensated. In this manner, the sustaining voltage of the sub pixel P22 obtained in the same frame period is the same as that of the sub pixel P23 through the effects of the feedthrough voltages thereof.

It can be readily understood by a person skilled in the art that, the two-row reversion driving mode is applicable for the HSD liquid crystal display panels and traditional liquid crystal display panels. The sub pixels in odd-numbered columns and the sub pixels in even-numbered columns can be configured with different equivalent capacitors, so that different feedthrough voltages can be generated, and thus the different degrees of brightness resulted from the differences among charge rates of sub pixels charged by the data lines can be compensated. In this case, the final charge voltage of the sub pixels in odd-numbered columns is consistent with that of the sub pixels in even-numbered columns, and thus the bright-dark lines along vertical direction can be eliminated.

Embodiment 2

Figure 6:
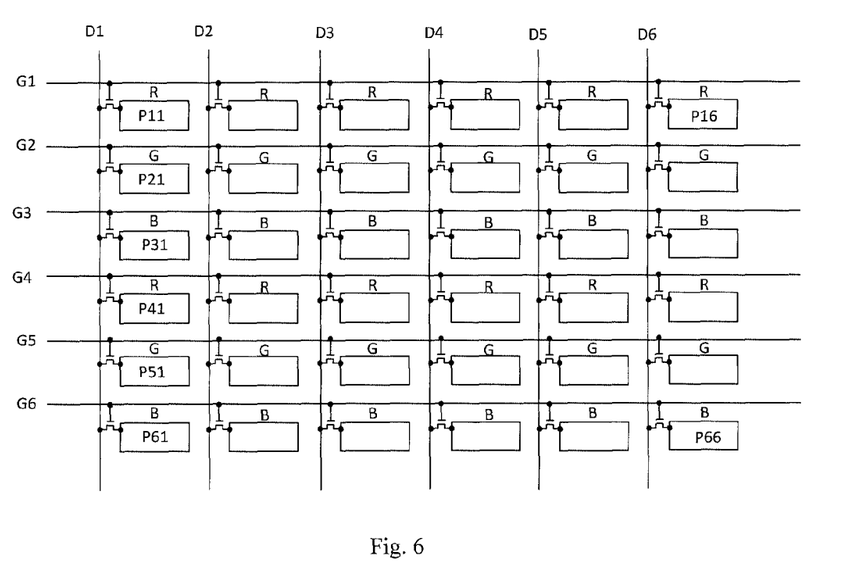
FIG. 6 is a structural diagram of a tri-gate liquid crystal display panel according to Embodiment 2 of the present disclosure.

FIG. 6 is a structural diagram of a tri-gate liquid crystal display panel according to the present embodiment. As shown in FIG. 6, the display panel comprises a pixel array formed by a plurality of data lines (such as data lines D1 to D6 as shown in FIG. 6) and a plurality of scanning lines (such as scanning lines G1 to G6 as shown in FIG. 6) that are configured orthogonally to each other, and a plurality of sub pixels P11 to P66 that are configured in the array, wherein a red sub pixel (R) P11, a green sub pixel (G) P21, and a blue sub pixel (B) P31 form a pixel unit.

In the case that a resolution of the display panel is n×m, a number of scanning lines of the tri-gate liquid crystal display panel is 3m, and a number of data lines thereof is n. By contrast, the number of scanning lines of a traditional display panel is m, and the number of data lines thereof is 3n. In other words, under the same resolution, the number of scanning lines of the tri-gate liquid crystal display panel is increased to three times as that of the traditional display panel, and the number of data lines thereof is reduced to one third of that of the traditional display panel. That is to say, in the tri-gate liquid crystal display panel, relatively more gate driving chips and relatively less source driving chips are used, and thus the manufacturing cost and power consumption thereof can be reduced.

In the prior art, the sub pixels of the tri-gate liquid crystal display panel would present different degrees of brightness in space during the same frame cycle, and thus bright-dark lines along the horizontal direction would occur in the tri-gate pixel array. The reasons for this display defect are stated below.

Figure 7:
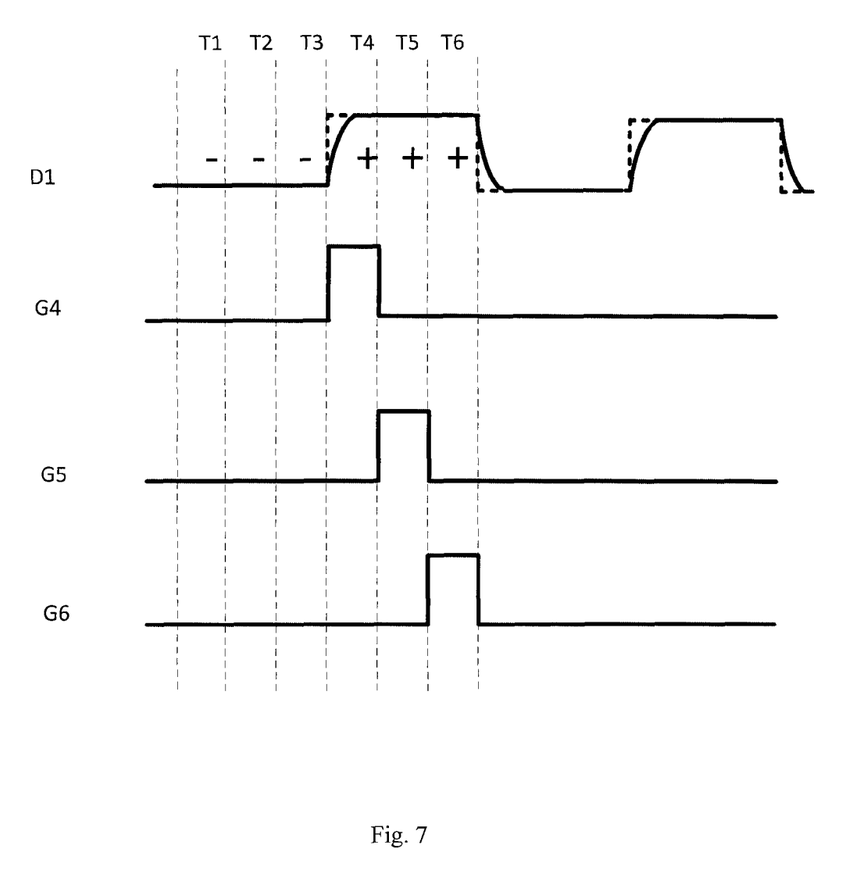
FIG. 7 schematically shows waveforms of voltages of driving signals of a data line and several scanning lines of a tri-gate display panel in the prior art; 30

The waveforms of voltages of driving signals of a data line and several scanning lines in one frame cycle are shown in FIG. 7. A polarity of a driving signal provided by a data line D1 is reversed periodically. According to the present embodiment, a first time period after polarity reversion is a scanning cycle T4, a second time period is a scanning cycle T5, and another second time period is a scanning cycle T6. In the present embodiment, the data line D1 is used for driving a first sub pixel P41, a second sub pixel P51, and another second sub pixel P61. During the scanning cycle T4, a first scanning line G4 is turned on, and the data line D1 charges the sub pixel P41 with a data signal voltage of a positive polarity. During the scanning cycle T5, a second scanning line G5 is turned on, and the data line D1 charges the sub pixel P51 with a data signal voltage of a positive polarity. Similarly, during the scanning cycle T6, another second scanning line G6 is turned on, and the data line D1 charges the sub pixel P61. The charge time of the sub pixels of the tri-gate display panel reduces two thirds compared with that of the traditional display panel, which would result in the problem of insufficient charge of the sub pixels.

As shown by the dotted line in FIG. 7, due to the RC delay of the data line D1, during a certain time period from the beginning of the scanning cycle T4, the driving signal of the data line D1 cannot reach a preset charge level, which renders that the sub pixel P41 is undercharged, and the brightness thereof is relatively low. By contrast, during the scanning cycles T5 and T6, the driving signal of the data line D1 has stably reached the preset charge level, so that the sub pixels P51 and P61 can be charged completely, and the brightness thereof is relatively high.

In addition, in the tri-gate pixel array, a three-horizontal line reversion driving mode, i.e., a three-row reversion driving mode can be used. During three scanning cycles, the polarity of the voltage of the data driving signal is reversed once. That is to say, a reversing cycle of the polarity of the voltage of the driving signal of the data line is equal to three scanning cycles. As shown in FIG. 7, at an initial moment of the scanning cycle T4, the polarity of the voltage of the driving signal of the data line D1 is reversed, i.e., the driving signal jumps from a low-level signal in the scanning cycle T3 to a high-level signal in the scanning cycle T4. At this time, since the voltage of the driving signal of the data line D1 should be changed to a rather large extent, the driving signal of the data line D1 cannot reach the preset charge level during a certain time period from the beginning of the scanning cycle T4, which renders that the sub pixel P41 is undercharged. By contrast, at an initial moment of each of the scanning cycles T5 and T6, the polarity of the voltage of the driving signal of the data line D1 is not reversed. During the scanning cycles T5 and T6, the driving signal of the data line D1 can be maintained at the stable preset charge level, and thus the sub pixels P51 and P61 can be charged completely.

Figure 8:
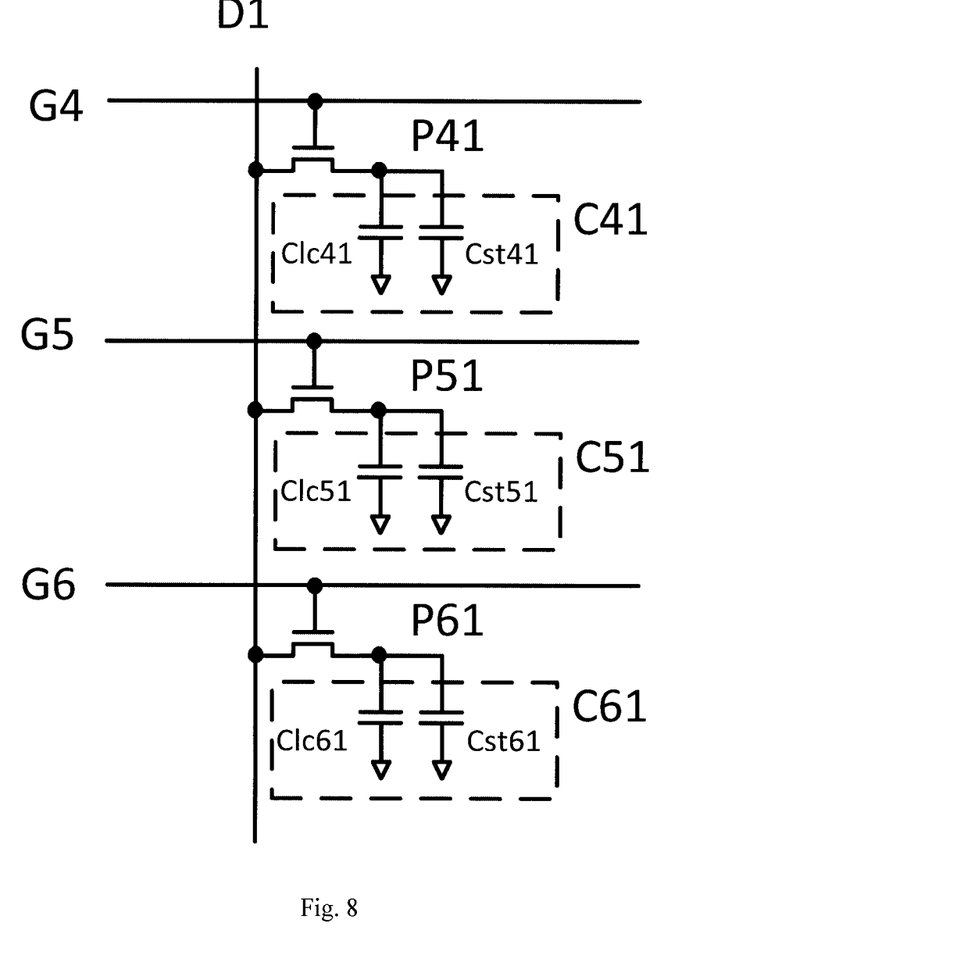
FIG. 8 schematically shows an equivalent circuit diagram of a sub pixel according to Embodiment 2.

As shown in the equivalent circuit diagram of FIG. 8, an equivalent capacitor is formed by the storage capacitor Cst and the liquid crystal capacitor Clc in parallel connection with each other. In the prior art, an equivalent capacitor of the sub pixel P41 is equal to that of the sub pixel P51 and that of the sub pixel P61, so that the feedthrough voltage $\Delta Vp41$ of the sub pixel P41 is equal to the feedthrough voltage $\Delta Vp51$ of the sub pixel P51, and also equal to the feedthrough voltage $\Delta Vp61$ of the sub pixel P61.

Figure 9:
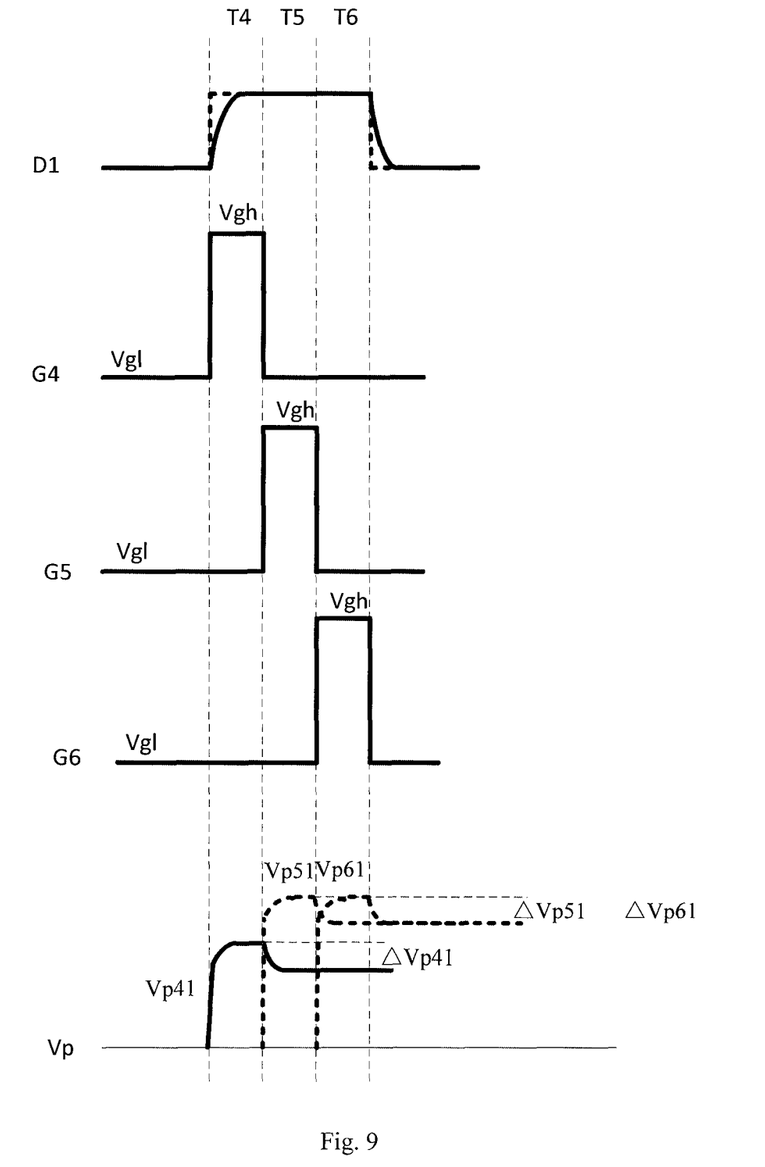
FIG. 9 schematically shows waveforms of voltages of pixel electrodes of sub pixels of a tri-gate display panel in the prior art.

Similar to embodiment 1, affected by the feedthrough voltages caused by the parasite capacitors thereof, the waveforms of voltages of pixel electrodes of the sub pixels P41, P51 and P61 vary as shown in FIG. 9.

At the initial moment of the scanning cycle T4, the scanning line G4 is turned on, and the driving signal of the data line D1 cannot reach the preset charge level, which would render that the charge rate of the sub pixel P41 charged by the data line D1 is relatively low. At a moment when the scanning cycle T4 comes to an end, a pixel voltage Vp41 of the sub pixel P41 reaches its highest value. After the scanning line G4 is turned off, a feedthrough voltage ΔVp41 gradually reduces the pixel voltage Vp41 to a stable sustaining voltage.

At the initial moment of the scanning cycle T5, the scanning line G5 is turned on, and the driving signal of the data line D1 can be maintained at the stable preset charge level, so that the charge rate of the sub pixel P51 charged by the data line D1 is relatively high. At a moment when the scanning cycle T5 comes to an end, a pixel voltage Vp51 of the sub pixel P51 reaches its highest value, which is higher than the highest value of the pixel voltage Vp41 of the sub pixel P41. After the scanning line G5 is turned off, a feedthrough voltage ΔVp51 gradually reduces the pixel voltage Vp51 to a stable sustaining voltage.

Similarly, at the initial moment of the scanning cycle T6, the scanning line G6 is turned on, and the charge rate of the sub pixel P61 charged by the data line D1 is relatively high. After the scanning line G6 is turned off, a feedthrough voltage ΔVp61 gradually reduces the pixel voltage Vp61 to a stable sustaining voltage.

Since the voltage of the driving signal of the scanning line G4 is completely the same as those of the scanning lines G5 and G6, and the equivalent capacitor C41 is equal to the equivalent capacitor C51 and the equivalent capacitor C61, i.e., the feedthrough voltages ΔVp41, ΔVp51 and ΔVp61 are equal to one another, the stable pixel voltage Vp41 of the sub pixel P41 obtained in the same frame period is lower than those of the sub pixels P51 and P61, which would result in that the brightness presented by the sub pixel P41 is relatively low while the brightness presented by the sub pixels P51 and P61 is relatively high.

Based on the above analysis, in the present embodiment, the sub pixels are configured with different values of equivalent capacitor, so that different feedthrough voltages can be generated. In this case, the sub pixels, after being charged by the data line, can obtain the sustaining voltage with the same value.

As shown in FIG. 8 again, the equivalent capacitor C41 of the sub pixel P41 can be configured to be larger than that of the second sub pixel P51 and another second sub pixel P61, i.e., C41>C51=C61, so that the feedthrough voltages ΔVp41<ΔVp51=AVp61 can be generated. Specifically, it is possible to configure the storage capacitors thereof Cst41>Cst51=Cst61, or the liquid crystal capacitors thereof Clc41>Clc51=Clc61. Since the equivalent capacitor is formed by the storage capacitor Cst and the liquid crystal capacitor Clc in parallel connection with each other, it can be readily understood that, it is possible to configure the storage capacitors thereof Cst41>Cst51=Cst61, and the liquid crystal capacitors thereof Clc41>Clc51=Clc61 at the same time.

Figure 10:
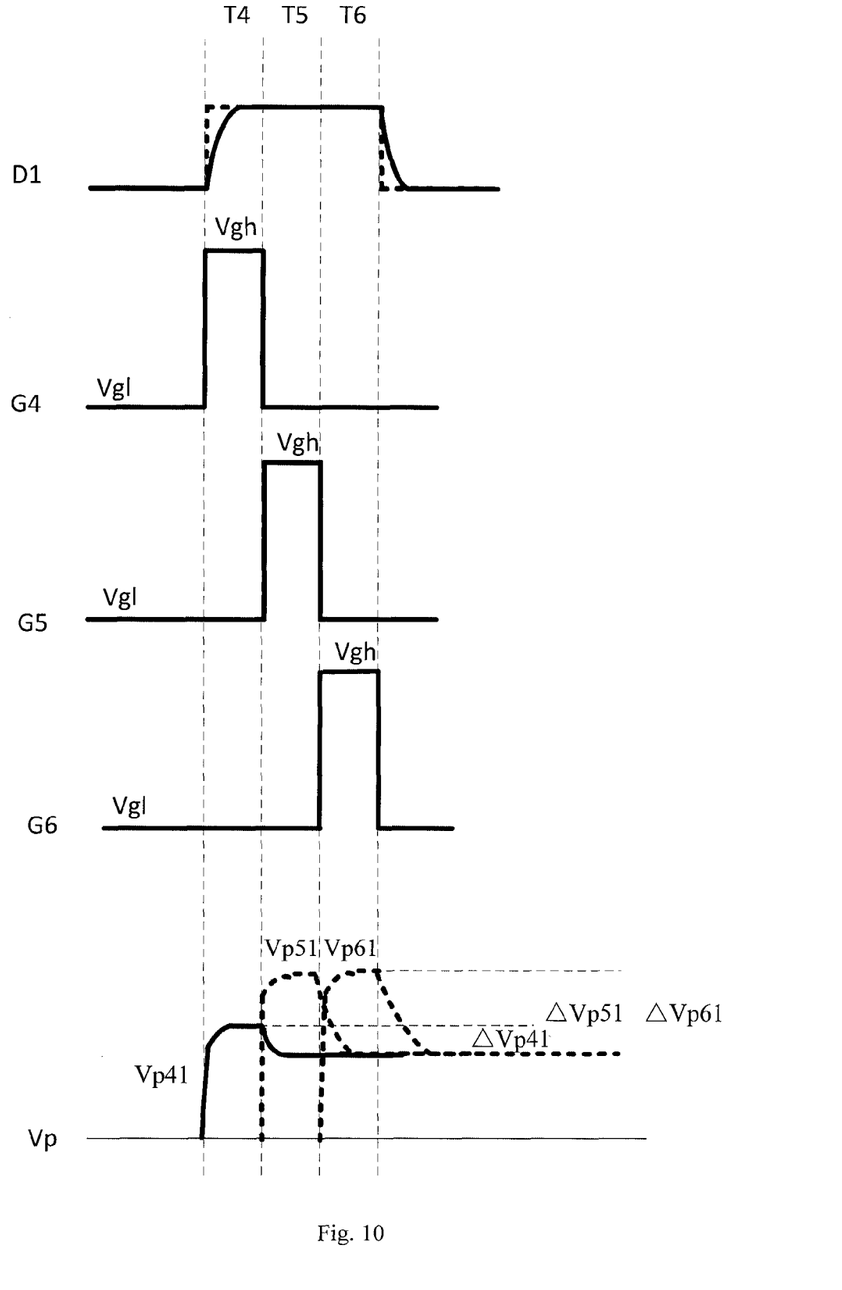
FIG. 10 schematically shows waveforms of voltages of pixel electrodes of sub pixels of a tri-gate display panel after being compensated by equivalent capacitances according to Embodiment 2.

In this case, the waveforms of voltages of pixel electrodes of the sub pixels P41, P51, and P61 vary as shown in FIG. 10.

At an initial moment of a scanning cycle T4, a driving signal of the data line D1 cannot reach a preset charge level.

In this case, the charge rate of the sub pixel P41 charged by the data line D1 is relatively low. At an end of the scanning cycle T4, a pixel voltage Vp41 of the sub pixel P41 reaches its highest value. After the scanning line G4 is turned off, a feedthrough voltage ΔVp41 gradually reduces the pixel voltage Vp41 to a stable sustaining voltage.

As shown in FIG. 10, a polarity of the driving signal of the data line D1 in the scanning cycle T4 is the same as that in a scanning cycle T5. At an initial moment of the scanning cycle T5, the driving signal of the data line D1 can be maintained at the stable preset charge level. At an end of the scanning cycle T5, a pixel voltage Vp51 of the sub pixel P51 reaches its highest value, which is higher than the highest value of Vp41 of the sub pixel P41. After the scanning line G5 is turned off, a feedthrough voltage ΔVp51 gradually reduces the pixel voltage Vp51 to a stable sustaining voltage.

Since the voltage of the driving signal provided by the scanning line G4 is the same as those provided by the scanning lines G5 and G6, and at the moment when the scanning lines G5 and G6 are turned off, the voltage of the driving signal thereof can reach the preset level, which is completely the same as that when the scanning line G4 is turned off, a difference between a turn-on voltage and a turn-off voltage, i.e., (Vgh−Vgl) of the sub pixel P41 is the same as those of the sub pixels P51 and P61. As shown in FIG. 8, according to the present embodiment, the equivalent capacitors thereof C41>C51=C61 can be configured, so that the feedthrough voltages thereof ΔVp41<ΔVp51=ΔVp61 can be generated. In this case, the sustaining voltage of the sub pixel P41 is the same as those of the sub pixels P51 and P61, and thus the brightness presented by the sub pixel P41 is the same as those of the sub pixels P51 and P61.

It should be noted that, the scanning cycles T4, T5, and T6 are equal to one another in duration. That is, the time period during which the scanning line G4 is turned on is equal to the time period during which the scanning line G5 is turned on, and also equal to the time period during which the scanning line G6 is turned on. Moreover, the voltage of the driving signal provided by the scanning line G4 is the same as those provided by the scanning lines G5 and G6. Therefore, according to the present embodiment, the driving modes of the gate driving chip and the source driving chip of a tri-gate liquid crystal display panel as used in the prior art need not to be changed. Hence, the liquid crystal display panel of the present embodiment is compatible with the driving chips in the prior art.

Similar to embodiment 1, since the value of the equivalent capacitor C41 is increased, the charge load of the sub pixel P41 charged by the data line D1 is relatively high, and thus the charge rate thereof is further reduced. Consequently, the differences among the peak values of the pixel voltages Vp41, Vp51, and Vp61 reached therein when the corresponding scanning line is turned off would become larger. The equivalent capacitors C41, C51, and C61 can be configured with different values, so that the sustaining voltage of the sub pixel P41 is equal to those of the sub pixels P51 and P61 through the effects of the feedthrough voltages.

In addition, during the driving procedure of the tri-gate liquid crystal display panel, the RC delay effect of the data line would become more serious. Different from the driving signal of the data line D1 as shown in FIG. 9, the voltage of the driving signal of the data line D1 cannot reach the preset charge level during both the scanning cycles T4 and T5. In this case, the sub pixels P41 and P51 are both undercharged, which would result in the peak values of the pixel voltages Vp41 and Vp51 being lower than that of the pixel voltage Vp61. Consequently, the brightness presented by the sub pixels P41 and P51 is relatively low, while the brightness presented by the sub pixel P61 is relatively high. Similarly, the equivalent capacitors C41, C51, and C61 can be configured with different values, so that the sustaining voltage of the sub pixels P41 and P51 can be equal to that of the sub pixel P61 through the effects of the feedthrough voltages.

It can be readily understood by a person skilled in the art that, as to the tri-gate liquid crystal display panel, the equivalent capacitor of the sub pixels in the 3k+1 and 3k+2 rows can be configured to be different from that of the sub pixels in the 3k rows (k is an integer and equal to or larger than 0), so that different feedthrough voltages can be generated. In this case, the sub pixels in different rows can obtain the same sustaining voltage after being charged by respective data lines, and the bright-dark lines along the horizontal direction can be eliminated.

In addition, the three-row reversion driving mode is applicable for the HSD liquid crystal display panels of embodiment 1 and traditional liquid crystal display panels. Under the reversion driving mode, the equivalent capacitor of the sub pixels in the 3k+1 and 3k+2 rows can be configured to be different from that of the sub pixels in the 3k rows, so that the difference among charge rates of the sub pixels charged by the data line can be compensated, and the display defect of uneven brightness can be eliminated.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A liquid crystal display panel, comprising:
   a plurality of sub pixels that are configured in a pixel array, said pixel array being formed by a plurality of data lines and a plurality of scanning lines that are configured orthogonally to each other, and said plurality of scanning lines comprising:
      a first scanning line, which is connected with a first sub pixel, and turned on during a first time period after a polarity of a voltage of a driving signal of a data line is reversed, the first sub pixel being charged through said data line; and
      at least one second scanning line, which are connected with at least one second sub pixel respectively, and turned on during a second time period after said first time period, the second sub pixel being charged through said data line,
   wherein a value of an equivalent capacitor of the first sub pixel is larger than that of the second sub pixel, so that a sustaining voltage of the first sub pixel is equal to that of the second sub pixel; and
   wherein a voltage of a driving signal of said second scanning line is equal to that of said first scanning line, so that a feedthrough voltage of said first sub pixel is less than that of the second sub pixel.

2. The liquid crystal display panel according to claim 1, wherein a value of a storage capacitor of said first sub pixel is larger than that of said second sub pixel, and/or a value of a liquid crystal capacitor of said first sub pixel is larger than that of said second sub pixel.

3. The liquid crystal display panel according to claim 2, wherein said data line is used for driving said first sub pixel and said at least one second sub pixel, and the polarity of the voltage of the driving signal of said data line is reversed periodically.

4. The liquid crystal display panel according to claim 3, wherein one single second scanning line is provided, and a reversing cycle of the polarity of the voltage of the driving signal of said data line is equal to two scanning cycles.

5. The liquid crystal display panel according to claim 3, wherein two second scanning lines are provided, and a reversing cycle of the polarity of the voltage of the driving signal of said data line is equal to three scanning cycles.

6. The liquid crystal display panel according to claim 3, wherein the first time period after the polarity of the voltage of the driving signal of said data line is reversed is equal to the second time period in duration, and a turn-on time of said first scanning line is equal to a turn-on time of said at least one second scanning line in duration.

7. The liquid crystal display panel according to claim 6, wherein the polarity of the voltage of the driving signal of said data line in the first time period is the same as that in the second time period.

8. The liquid crystal display panel according to claim 6, wherein the polarity of the voltage of the driving signal of said data line is reversed through row reversion mode.

9. The liquid crystal display panel according to claim 6, wherein said pixel array is a half source driving pixel array or a tri-gate pixel array.

* * * * *